(12) United States Patent
Russo

(10) Patent No.: US 8,811,723 B2
(45) Date of Patent: Aug. 19, 2014

(54) USER INPUT UTILIZING DUAL LINE SCANNER APPARATUS AND METHOD

(71) Applicant: Synaptics Incorporated, San Jose, CA (US)

(72) Inventor: Anthony Russo, New York, NY (US)

( * ) Notice: Subject to any disclaimer, the term of this patent is extended or adjusted under 35 U.S.C. 154(b) by 0 days.

(21) Appl. No.: 13/971,644

(22) Filed: Aug. 20, 2013

(65) Prior Publication Data

US 2013/0335322 A1 Dec. 19, 2013

Related U.S. Application Data

(63) Continuation of application No. 13/014,507, filed on Jan. 26, 2011, now Pat. No. 8,538,097.

(51) Int. Cl.
*G06K 9/62* (2006.01)

(52) U.S. Cl.
USPC .......................................................... 382/157

(58) Field of Classification Search
None
See application file for complete search history.

(56) References Cited

U.S. PATENT DOCUMENTS

| | | | |
|---|---|---|---|
| 3,593,319 A | 7/1971 | Barber | |
| 4,151,512 A | 4/1979 | Riganati et al. | |
| 4,225,850 A | 9/1980 | Chang et al. | |
| 4,310,827 A | 1/1982 | Asi | |
| 4,353,056 A | 10/1982 | Tsikos | |
| 4,405,829 A | 9/1983 | Rivest et al. | |
| 4,525,859 A | 6/1985 | Bowles et al. | |
| 4,550,221 A | 10/1985 | Mabusth | |
| 4,580,790 A | 4/1986 | Doose | |
| 4,582,985 A | 4/1986 | Loftberg | |
| 4,675,544 A | 6/1987 | Schrenk | |
| 4,758,622 A | 7/1988 | Gosselin | |
| 4,817,183 A | 3/1989 | Sparrow | |
| 5,076,566 A | 12/1991 | Kriegel | |
| 5,079,949 A | 1/1992 | Tamori | |
| 5,109,427 A | 4/1992 | Yang | |

(Continued)

FOREIGN PATENT DOCUMENTS

| | | |
|---|---|---|
| DE | 2213813 A1 | 10/1973 |
| EP | 0791899 A2 | 8/1997 |

(Continued)

OTHER PUBLICATIONS

Matsumoto et al., Impact of Artificial "Gummy" Fingers on Fingerprint Systems, SPIE 4677 (2002), reprinted from cryptome.org.

(Continued)

*Primary Examiner* — Vikkram Bali
(74) *Attorney, Agent, or Firm* — Shartsis Friese LLP; Cecily Anne O'Regan; William C. Cray

(57) ABSTRACT

A user input method and apparatus may comprise a two line object imaging sensor having a primary line scan-sensor providing a primary line scan-sensor output and a secondary line scan-sensor providing a secondary line scan-sensor output, representing pixels in a current primary scan row and a current secondary scan row, and adapted to scan an object; storing for each scan time each current primary line scan-sensor output and each current secondary line scan-sensor output and a correlation unit correlating at least one of the current representations of pixels in a primary line sensor output with stored representations and the current representations of pixels in a secondary line sensor output with stored representations and, the correlation unit providing as an output a motion indicator.

20 Claims, 5 Drawing Sheets

(56) References Cited

U.S. PATENT DOCUMENTS

| | | |
|---|---|---|
| 5,140,642 A | 8/1992 | Hau et al. |
| 5,270,949 A | 12/1993 | Atherton et al. |
| 5,305,017 A | 4/1994 | Gerpheide |
| 5,319,323 A | 6/1994 | Fong |
| 5,325,442 A | 6/1994 | Knapp |
| 5,359,243 A | 10/1994 | Norman |
| 5,420,936 A | 5/1995 | Fitzpatrick et al. |
| 5,422,807 A | 6/1995 | Mitra et al. |
| 5,429,006 A | 7/1995 | Tamori |
| 5,456,256 A | 10/1995 | Schneider et al. |
| 5,515,738 A | 5/1996 | Tamori |
| 5,543,591 A | 8/1996 | Gillespie et al. |
| 5,569,901 A | 10/1996 | Bridgelall et al. |
| 5,623,552 A | 4/1997 | Lane |
| 5,627,316 A | 5/1997 | De Winter et al. |
| 5,650,842 A | 7/1997 | Maase et al. |
| 5,717,777 A | 2/1998 | Wong et al. |
| 5,781,651 A | 7/1998 | Hsiao et al. |
| 5,801,681 A | 9/1998 | Sayag |
| 5,818,956 A | 10/1998 | Tuli |
| 5,828,773 A | 10/1998 | Setlak et al. |
| 5,838,306 A | 11/1998 | O'Connor et al. |
| 5,844,287 A | 12/1998 | Hassan et al. |
| 5,848,176 A | 12/1998 | Hara et al. |
| 5,850,450 A | 12/1998 | Schweitzer et al. |
| 5,852,670 A | 12/1998 | Setlak et al. |
| 5,864,296 A | 1/1999 | Upton |
| 5,887,343 A | 3/1999 | Salatino et al. |
| 5,892,824 A | 4/1999 | Beatson et al. |
| 5,903,225 A | 5/1999 | Schmitt et al. |
| 5,915,757 A | 6/1999 | Tsuyama et al. |
| 5,920,384 A | 7/1999 | Borza |
| 5,920,640 A | 7/1999 | Salatino et al. |
| 5,940,526 A | 8/1999 | Setlak et al. |
| 5,963,679 A | 10/1999 | Setlak |
| 5,995,630 A | 11/1999 | Borza |
| 5,999,637 A | 12/1999 | Toyoda et al. |
| 6,002,389 A | 12/1999 | Kasser |
| 6,002,815 A | 12/1999 | Immega et al. |
| 6,011,859 A | 1/2000 | Kalnitsky et al. |
| 6,016,355 A | 1/2000 | Dickinson et al. |
| 6,052,475 A | 4/2000 | Upton |
| 6,067,368 A | 5/2000 | Setlak et al. |
| 6,073,343 A | 6/2000 | Petrick et al. |
| 6,076,566 A | 6/2000 | Lowe |
| 6,088,585 A | 7/2000 | Schmitt et al. |
| 6,098,175 A | 8/2000 | Lee |
| 6,118,318 A | 9/2000 | Fifield et al. |
| 6,134,340 A | 10/2000 | Hsu et al. |
| 6,157,722 A | 12/2000 | Lerner et al. |
| 6,161,213 A | 12/2000 | Lofstrom |
| 6,175,407 B1 | 1/2001 | Sartor |
| 6,182,076 B1 | 1/2001 | Yu et al. |
| 6,182,892 B1 | 2/2001 | Angelo et al. |
| 6,185,318 B1 | 2/2001 | Jain et al. |
| 6,234,031 B1 | 5/2001 | Suga |
| 6,241,288 B1 | 6/2001 | Bergenek et al. |
| 6,259,108 B1 | 7/2001 | Antonelli et al. |
| 6,289,114 B1 | 9/2001 | Mainguet |
| 6,292,272 B1 | 9/2001 | Okauchi et al. |
| 6,317,508 B1 | 11/2001 | Kramer et al. |
| 6,320,394 B1 | 11/2001 | Tartagni |
| 6,325,285 B1 | 12/2001 | Baratelli |
| 6,327,376 B1 | 12/2001 | Harkin |
| 6,330,345 B1 | 12/2001 | Russo et al. |
| 6,332,193 B1 | 12/2001 | Glass et al. |
| 6,333,989 B1 | 12/2001 | Borza |
| 6,337,919 B1 | 1/2002 | Dunton |
| 6,343,162 B1 | 1/2002 | Saito et al. |
| 6,346,739 B1 | 2/2002 | Lepert et al. |
| 6,347,040 B1 | 2/2002 | Fries et al. |
| 6,357,663 B1 | 3/2002 | Takahashi et al. |
| 6,360,004 B1 | 3/2002 | Akizuki |
| 6,362,633 B1 | 3/2002 | Tartagni |
| 6,392,636 B1 | 5/2002 | Ferrari et al. |
| 6,399,994 B2 | 6/2002 | Shobu |
| 6,400,836 B2 | 6/2002 | Senior |
| 6,408,087 B1 | 6/2002 | Kramer |
| 6,459,804 B2 | 10/2002 | Mainguet |
| 6,473,072 B1 | 10/2002 | Comiskey et al. |
| 6,481,294 B2 | 11/2002 | Zellner et al. |
| 6,509,501 B1 | 1/2003 | Eicken et al. |
| 6,512,381 B2 | 1/2003 | Kramer |
| 6,525,547 B2 | 2/2003 | Hayes |
| 6,525,932 B1 | 2/2003 | Ohnishi et al. |
| 6,535,622 B1 | 3/2003 | Russo et al. |
| 6,539,101 B1 | 3/2003 | Black |
| 6,546,122 B1 | 4/2003 | Russo |
| 6,580,816 B2 | 6/2003 | Kramer et al. |
| 6,597,289 B2 | 7/2003 | Sabatini |
| 6,628,812 B1 | 9/2003 | Setlak et al. |
| 6,631,201 B1 | 10/2003 | Dickinson et al. |
| 6,643,389 B1 | 11/2003 | Raynal et al. |
| 6,672,174 B2 | 1/2004 | Deconde et al. |
| 6,710,461 B2 | 3/2004 | Chou et al. |
| 6,738,050 B2 | 5/2004 | Comiskey et al. |
| 6,741,729 B2 | 5/2004 | Bjorn et al. |
| 6,757,002 B1 | 6/2004 | Oross et al. |
| 6,766,040 B1 | 7/2004 | Catalano et al. |
| 6,785,407 B1 | 8/2004 | Tschudi et al. |
| 6,799,275 B1 | 9/2004 | Bjorn et al. |
| 6,836,230 B2 | 12/2004 | Le Pailleur et al. |
| 6,838,905 B1 | 1/2005 | Doyle |
| 6,862,942 B2 | 3/2005 | Kawahata |
| 6,873,356 B1 | 3/2005 | Kanbe et al. |
| 6,886,104 B1 | 4/2005 | McClurg et al. |
| 6,897,002 B2 | 5/2005 | Teraoka et al. |
| 6,898,299 B1 | 5/2005 | Brooks |
| 6,924,496 B2 | 8/2005 | Manansala |
| 6,937,748 B1 | 8/2005 | Schneider et al. |
| 6,941,001 B1 | 9/2005 | Bolle et al. |
| 6,941,810 B2 | 9/2005 | Okada |
| 6,950,540 B2 | 9/2005 | Higuchi |
| 6,959,874 B2 | 11/2005 | Bardwell |
| 6,963,626 B1 | 11/2005 | Shaeffer et al. |
| 6,970,584 B2 | 11/2005 | O'Gorman et al. |
| 6,980,672 B2 | 12/2005 | Saito et al. |
| 6,983,882 B2 | 1/2006 | Cassone |
| 7,013,030 B2 | 3/2006 | Wong et al. |
| 7,020,591 B1 | 3/2006 | Wei et al. |
| 7,030,860 B1 | 4/2006 | Hsu et al. |
| 7,031,670 B2 | 4/2006 | May |
| 7,035,443 B2 | 4/2006 | Wong |
| 7,042,535 B2 | 5/2006 | Katoh et al. |
| 7,043,061 B2 | 5/2006 | Hamid et al. |
| 7,043,644 B2 | 5/2006 | DeBruine |
| 7,046,230 B2 | 5/2006 | Zadesky et al. |
| 7,064,743 B2 | 6/2006 | Nishikawa |
| 7,099,496 B2 | 8/2006 | Benkley |
| 7,110,574 B2 | 9/2006 | Haruki et al. |
| 7,110,577 B1 | 9/2006 | Tschud |
| 7,113,622 B2 | 9/2006 | Hamid |
| 7,126,389 B1 | 10/2006 | McRae et al. |
| 7,129,926 B2 | 10/2006 | Mathiassen et al. |
| 7,136,514 B1 | 11/2006 | Wong |
| 7,146,024 B2 | 12/2006 | Benkley |
| 7,146,026 B2 | 12/2006 | Russon et al. |
| 7,146,029 B2 | 12/2006 | Manansala |
| 7,184,581 B2 | 2/2007 | Johansen et al. |
| 7,190,209 B2 | 3/2007 | Kang et al. |
| 7,190,816 B2 | 3/2007 | Mitsuyu et al. |
| 7,194,392 B2 | 3/2007 | Tuken et al. |
| 7,197,168 B2 | 3/2007 | Russo |
| 7,200,250 B2 | 4/2007 | Chou |
| 7,251,351 B2 | 7/2007 | Mathiassen et al. |
| 7,258,279 B2 | 8/2007 | Schneider et al. |
| 7,260,246 B2 | 8/2007 | Fujii |
| 7,263,212 B2 | 8/2007 | Kawabe |
| 7,263,213 B2 | 8/2007 | Rowe |
| 7,289,649 B1 | 10/2007 | Walley et al. |
| 7,290,323 B2 | 11/2007 | Deconde et al. |
| 7,308,121 B2 | 12/2007 | Mathiassen et al. |
| 7,308,122 B2 | 12/2007 | McClurg et al. |
| 7,321,672 B2 | 1/2008 | Sasaki et al. |

(56) References Cited

U.S. PATENT DOCUMENTS

| | | |
|---|---|---|
| 7,356,169 B2 | 4/2008 | Hamid |
| 7,360,688 B1 | 4/2008 | Harris |
| 7,369,685 B2 | 5/2008 | DeLeon |
| 7,379,569 B2 | 5/2008 | Chikazawa et al. |
| 7,408,135 B2 | 8/2008 | Fujieda |
| 7,409,876 B2 | 8/2008 | Ganapathi et al. |
| 7,412,083 B2 | 8/2008 | Takahashi |
| 7,424,618 B2 | 9/2008 | Roy et al. |
| 7,447,339 B2 | 11/2008 | Mimura et al. |
| 7,447,911 B2 | 11/2008 | Chou et al. |
| 7,460,697 B2 | 12/2008 | Erhart et al. |
| 7,463,756 B2 | 12/2008 | Benkley |
| 7,474,772 B2 | 1/2009 | Russo et al. |
| 7,505,611 B2 | 3/2009 | Fyke |
| 7,505,613 B2 | 3/2009 | Russo |
| 7,565,548 B2 | 7/2009 | Fiske et al. |
| 7,574,022 B2 | 8/2009 | Russo |
| 7,596,832 B2 | 10/2009 | Hsieh et al. |
| 7,599,530 B2 | 10/2009 | Boshra |
| 7,616,787 B2 | 11/2009 | Boshra |
| 7,634,117 B2 | 12/2009 | Cho |
| 7,643,950 B1 | 1/2010 | Getzin et al. |
| 7,646,897 B2 | 1/2010 | Fyke |
| 7,681,232 B2 | 3/2010 | Nordentoft et al. |
| 7,689,013 B2 | 3/2010 | Shinzaki |
| 7,706,581 B2 | 4/2010 | Drews et al. |
| 7,733,697 B2 | 6/2010 | Picca et al. |
| 7,734,074 B2 | 6/2010 | Setlak et al. |
| 7,751,601 B2 | 7/2010 | Benkley |
| 7,826,645 B1 | 11/2010 | Cayen |
| 7,843,438 B2 | 11/2010 | Onoda |
| 7,848,798 B2 | 12/2010 | Martinsen et al. |
| 7,899,216 B2 | 3/2011 | Watanabe et al. |
| 7,953,258 B2 | 5/2011 | Dean et al. |
| 8,005,276 B2 | 8/2011 | Dean et al. |
| 8,031,916 B2 | 10/2011 | Abiko et al. |
| 8,063,734 B2 | 11/2011 | Conforti |
| 8,077,935 B2 | 12/2011 | Geoffroy et al. |
| 8,107,212 B2 | 1/2012 | Nelson et al. |
| 8,116,540 B2 | 2/2012 | Dean et al. |
| 8,131,026 B2 | 3/2012 | Benkley et al. |
| 8,165,355 B2 | 4/2012 | Benkley et al. |
| 8,175,345 B2 | 5/2012 | Gardner |
| 8,204,281 B2 | 6/2012 | Satya et al. |
| 8,224,044 B2 | 7/2012 | Benkley |
| 8,229,184 B2 | 7/2012 | Benkley |
| 8,276,816 B2 | 10/2012 | Gardner |
| 8,278,946 B2 | 10/2012 | Thompson |
| 8,290,150 B2 | 10/2012 | Erhart et al. |
| 8,315,444 B2 | 11/2012 | Gardner |
| 8,331,096 B2 | 12/2012 | Garcia |
| 8,358,815 B2 | 1/2013 | Benkley et al. |
| 8,374,407 B2 | 2/2013 | Benkley et al. |
| 8,391,568 B2 | 3/2013 | Satyan |
| 8,447,077 B2 | 5/2013 | Benkley et al. |
| RE44,440 E | 8/2013 | Getzin et al. |
| 8,520,913 B2 | 8/2013 | Dean et al. |
| 2001/0026636 A1 | 10/2001 | Mainguet |
| 2001/0030644 A1 | 10/2001 | Allport |
| 2001/0036299 A1 | 11/2001 | Senior |
| 2001/0043728 A1 | 11/2001 | Kramer et al. |
| 2002/0014530 A1 | 2/2002 | Iihama |
| 2002/0025062 A1 | 2/2002 | Black |
| 2002/0061125 A1 | 5/2002 | Fujii |
| 2002/0064892 A1 | 5/2002 | Lepert et al. |
| 2002/0067845 A1 | 6/2002 | Griffis |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0152048 A1 | 10/2002 | Hayes |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley |
| 2003/0063782 A1 | 4/2003 | Acharya et al. |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0095690 A1 | 5/2003 | Su et al. |
| 2003/0102874 A1 | 6/2003 | Lane et al. |
| 2003/0123714 A1 | 7/2003 | O'Gorman et al. |
| 2003/0123715 A1 | 7/2003 | Uchida |
| 2003/0141959 A1 | 7/2003 | Keogh et al. |
| 2003/0147015 A1 | 8/2003 | Katoh et al. |
| 2003/0161510 A1 | 8/2003 | Fujii |
| 2003/0161512 A1 | 8/2003 | Mathiassen |
| 2003/0169228 A1 | 9/2003 | Mathiassen et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0017934 A1 | 1/2004 | Kocher |
| 2004/0021786 A1 | 2/2004 | Nakamura et al. |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0155752 A1 | 8/2004 | Radke |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0188838 A1 | 9/2004 | Okada et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0100938 A1 | 5/2005 | Hofmann et al. |
| 2005/0103611 A1 | 5/2005 | Holscher |
| 2005/0109835 A1 | 5/2005 | Jacoby et al. |
| 2005/0110103 A1 | 5/2005 | Setlak |
| 2005/0111708 A1 | 5/2005 | Chou |
| 2005/0123176 A1 | 6/2005 | Ishii et al. |
| 2005/0129291 A1 | 6/2005 | Boshra |
| 2005/0136200 A1 | 6/2005 | Durell et al. |
| 2005/0139656 A1 | 6/2005 | Arnouse |
| 2005/0139685 A1 | 6/2005 | Kozlay |
| 2005/0162402 A1 | 7/2005 | Watanachote |
| 2005/0169503 A1 | 8/2005 | Howell et al. |
| 2005/0174015 A1 | 8/2005 | Scott et al. |
| 2005/0210271 A1 | 9/2005 | Chou et al. |
| 2005/0219200 A1 | 10/2005 | Weng |
| 2005/0220329 A1 | 10/2005 | Payne et al. |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0247559 A1 | 11/2005 | Frey et al. |
| 2005/0249386 A1 | 11/2005 | Juh |
| 2005/0258952 A1 | 11/2005 | Utter et al. |

(56) References Cited

U.S. PATENT DOCUMENTS

| | | |
|---|---|---|
| 2005/0269402 A1 | 12/2005 | Spitzer et al. |
| 2006/0006224 A1 | 1/2006 | Modi |
| 2006/0055500 A1 | 3/2006 | Burke et al. |
| 2006/0057756 A1 | 3/2006 | Sato et al. |
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Fukushige et al. |
| 2006/0181521 A1 | 8/2006 | Perreault et al. |
| 2006/0182319 A1 | 8/2006 | Setlank et al. |
| 2006/0187200 A1 | 8/2006 | Martin |
| 2006/0210082 A1 | 9/2006 | Devadas et al. |
| 2006/0214512 A1 | 9/2006 | Iwata |
| 2006/0214767 A1 | 9/2006 | Carrieri |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0267125 A1 | 11/2006 | Huang et al. |
| 2006/0267385 A1 | 11/2006 | Steenwyk et al. |
| 2006/0271793 A1 | 11/2006 | Devadas et al. |
| 2006/0285728 A1 | 12/2006 | Leung et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0058843 A1 | 3/2007 | Theis et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0154072 A1 | 7/2007 | Taraba et al. |
| 2007/0160269 A1 | 7/2007 | Kuo |
| 2007/0180261 A1 | 8/2007 | Akkermans et al. |
| 2007/0196002 A1 | 8/2007 | Choi et al. |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0237368 A1 | 10/2007 | Bjorn et al. |
| 2007/0248249 A1 | 10/2007 | Stoianov |
| 2007/0290124 A1 | 12/2007 | Neil et al. |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0069412 A1 | 3/2008 | Champagne et al. |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0201265 A1 | 8/2008 | Hewton |
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1 | 9/2008 | Saito et al. |
| 2008/0226132 A1 | 9/2008 | Gardner |
| 2008/0238878 A1 | 10/2008 | Wang |
| 2008/0240523 A1 | 10/2008 | Benkley et al. |
| 2008/0240537 A1 | 10/2008 | Yang et al. |
| 2008/0244277 A1 | 10/2008 | Orsini et al. |
| 2008/0267462 A1 | 10/2008 | Nelson et al. |
| 2008/0279373 A1 | 11/2008 | Erhart et al. |
| 2008/0317290 A1 | 12/2008 | Tazoe |
| 2009/0001999 A1 | 1/2009 | Douglas |
| 2009/0130369 A1 | 5/2009 | Huang et al. |
| 2009/0140838 A1 | 6/2009 | Newman et al. |
| 2009/0153297 A1 | 6/2009 | Gardner |
| 2009/0154779 A1 | 6/2009 | Satyan et al. |
| 2009/0155456 A1 | 6/2009 | Benkley et al. |
| 2009/0169071 A1 | 7/2009 | Bond et al. |
| 2009/0174974 A1 | 7/2009 | Huang et al. |
| 2009/0212902 A1 | 8/2009 | Haddock |
| 2009/0218698 A1 | 9/2009 | Lam |
| 2009/0237135 A1 | 9/2009 | Ramaraju et al. |
| 2009/0252384 A1 | 10/2009 | Dean et al. |
| 2009/0252385 A1 | 10/2009 | Dean et al. |
| 2009/0252386 A1 | 10/2009 | Dean et al. |
| 2009/0279742 A1 | 11/2009 | Abiko |
| 2009/0319435 A1 | 12/2009 | Little, Jr. et al. |
| 2009/0324028 A1 | 12/2009 | Russo |
| 2010/0026451 A1 | 2/2010 | Erhart et al. |
| 2010/0045705 A1 | 2/2010 | Vertegaal et al. |
| 2010/0083000 A1 | 4/2010 | Kesanupalli et al. |
| 2010/0117224 A1 | 5/2010 | McElrea et al. |
| 2010/0117794 A1 | 5/2010 | Adams et al. |
| 2010/0119124 A1 | 5/2010 | Satyan |
| 2010/0123675 A1 | 5/2010 | Ippel |
| 2010/0127366 A1 | 5/2010 | Bond et al. |
| 2010/0176823 A1 | 7/2010 | Thompson et al. |
| 2010/0176892 A1 | 7/2010 | Thompson et al. |
| 2010/0177940 A1 | 7/2010 | Thompson et al. |
| 2010/0180136 A1 | 7/2010 | Thompson et al. |
| 2010/0189314 A1 | 7/2010 | Benkley et al. |
| 2010/0208953 A1 | 8/2010 | Gardner et al. |
| 2010/0244166 A1 | 9/2010 | Shibuta et al. |
| 2010/0272329 A1 | 10/2010 | Benkley |
| 2010/0284565 A1 | 11/2010 | Benkley |
| 2011/0002461 A1 | 1/2011 | Erhart et al. |
| 2011/0018556 A1 | 1/2011 | Le et al. |
| 2011/0083018 A1 | 4/2011 | Kesanupalli et al. |
| 2011/0083170 A1 | 4/2011 | Kesanupalli et al. |
| 2011/0090047 A1 | 4/2011 | Patel |
| 2011/0102567 A1 | 5/2011 | Erhart |
| 2011/0102569 A1 | 5/2011 | Erhart |
| 2011/0175703 A1 | 7/2011 | Benkley |
| 2011/0176037 A1 | 7/2011 | Benkley |
| 2011/0182486 A1 | 7/2011 | Valfridsson et al. |
| 2011/0214924 A1 | 9/2011 | Perezselsky et al. |
| 2011/0221942 A1 | 9/2011 | Taura |
| 2011/0267298 A1 | 11/2011 | Erhart et al. |
| 2011/0298711 A1 | 12/2011 | Dean et al. |
| 2011/0304001 A1 | 12/2011 | Erhart et al. |
| 2012/0044639 A1 | 2/2012 | Garcia |
| 2012/0148122 A1 | 6/2012 | Dean et al. |
| 2012/0189166 A1 | 7/2012 | Russo |
| 2012/0189172 A1 | 7/2012 | Russo |
| 2012/0206586 A1 | 8/2012 | Gardner |
| 2012/0256280 A1 | 10/2012 | Erhart |
| 2012/0257032 A1 | 10/2012 | Benkley |
| 2012/0308092 A1 | 12/2012 | Benkley et al. |
| 2013/0021044 A1 | 1/2013 | Thompson et al. |
| 2013/0094715 A1 | 4/2013 | Benkley et al. |
| 2013/0177220 A1 | 7/2013 | Erhart et al. |

FOREIGN PATENT DOCUMENTS

| | | |
|---|---|---|
| EP | 0791899 A3 | 8/1997 |
| EP | 0791899 B1 | 8/1997 |
| EP | 0929028 A2 | 1/1998 |
| EP | 0905646 A1 | 3/1999 |
| EP | 0973123 A1 | 1/2000 |
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1536368 A1 | 6/2005 |
| EP | 1538548 A2 | 6/2005 |
| EP | 1624399 B1 | 2/2006 |
| EP | 1775674 A1 | 4/2007 |
| EP | 1939788 A1 | 7/2008 |
| GB | 2331613 A | 5/1999 |
| GB | 2480919 | 12/2011 |
| GB | 2487661 A1 | 8/2012 |

(56) References Cited

FOREIGN PATENT DOCUMENTS

| | | |
|---|---|---|
| GB | 2489100 A | 9/2012 |
| GB | 2490192 | 10/2012 |
| GB | 2474999 B | 2/2013 |
| GB | 2499497 | 8/2013 |
| JP | 01094418 A2 | 4/1989 |
| JP | 04158434 A2 | 6/1992 |
| JP | 2003256820 A | 9/2003 |
| JP | 2005011002 A | 1/2005 |
| JP | 2005242856 | 9/2005 |
| JP | 2006053768 | 6/2006 |
| JP | 2007305097 A | 11/2007 |
| JP | 3569804 B2 | 9/2009 |
| TW | 200606745 A | 2/2006 |
| TW | 200606746 | 2/2006 |
| TW | 200614092 | 5/2006 |
| TW | 200617798 | 6/2006 |
| TW | 200620140 A | 6/2006 |
| TW | 200629167 A | 8/2006 |
| WO | WO 90/03620 A1 | 4/1990 |
| WO | WO 98/58342 A1 | 12/1998 |
| WO | WO 99/28701 A1 | 6/1999 |
| WO | WO 99/43258 A1 | 9/1999 |
| WO | WO 99/46724 A1 | 9/1999 |
| WO | WO 01/22349 A1 | 3/2001 |
| WO | WO 01/59558 A1 | 8/2001 |
| WO | WO 01/94902 A2 | 12/2001 |
| WO | WO 01/94902 A3 | 12/2001 |
| WO | WO 01/95304 A1 | 12/2001 |
| WO | WO 02/11066 A1 | 2/2002 |
| WO | WO 02/47018 A2 | 6/2002 |
| WO | WO 02/47018 A3 | 6/2002 |
| WO | WO 02/061668 A1 | 8/2002 |
| WO | WO 02/077907 A1 | 10/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/0104012 A1 | 11/2005 |
| WO | WO 2005/106774 A2 | 11/2005 |
| WO | WO 2005/106774 A3 | 11/2005 |
| WO | WO 2006/040724 A1 | 4/2006 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/088248 A1 | 1/2011 |
| WO | WO/2011/088252 A1 | 1/2011 |
| WO | WO 2011/053797 A1 | 5/2011 |

OTHER PUBLICATIONS

Maltoni, "Handbook of Fingerprint Recognition", XP002355942 Springer, New York, USA, Jun. 2003 pp. 65-69.

Vermasan, et al., "A500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Shu, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet: URL:http://alexandria.tue.nl/extral/afstversl/wsk-i/hgt2008.pdf [retrieved on Mar. 29, 2011] pp. 127-134, paragraph 6.2.

Gassend, et al., "Controlled Physical Random Functions", In Proceedings of the 18th Annual Computer Security Conference, Las Vegas, Nevada, Dec. 12, 2002.

Wikipedia (Mar. 2003). "Integrated Circuit," http://en.wikipedia.org/wiki/integrated_circuit. Revision as of Mar. 23, 2003.

Wikipedia (Dec. 2006). "Integrated circuit" Revision as of Dec. 10, 2006. http://en.widipedia.org/wiki/Integrated_circuit.

bellagiodesigns.com (Internet Archive Wayback Machine, www.bellagiodesigns.com date: Oct. 29, 2005).

Closed Loop Systems, The Free Dictionary, http://www.thefreedictionary.com/closed-loop+system (downloaded Dec. 1, 2011).

Feedback: Electronic Engineering, Wikipedia, p. 5 http://en.wikipedia.org/wiki/Feedback#Electronic_engineering (downloaded Dec. 1, 2011).

Galy et al. (Jul. 2007) "A full fingerprint verification system for a single-line sweep sensor." IEEE Sensors J., vol. 7 No. 7, pp. 1054-1065.

USER INPUT UTILIZING DUAL LINE SCANNER APPARATUS AND METHOD

CROSS-REFERENCE

This application is a continuation of Ser. No. 13/014,507, filed Jan. 26, 2011, by Russo, entitled User Input Utilizing Dual Line Scanner Apparatus and Method, which is incorporated herein by reference in its entirety and to which application priority is claimed under 35 USC §120.

BACKGROUND

Some conventional fingerprint scanners include large, postage-stamp size units, called contact or placement sensors, that sense an entire fingerprint at once (e.g., an entire fingerprint including images of 200-500 rows and 128-200 columns of pixels). Other fingerprint scanners include smaller swipe scanners incorporated into laptop and notebook computers, mobile phones, mobile email devices, and smartphones. Smaller swipe scanners are much less expensive to manufacture than larger placement scanners. Stationary swipe fingerprint scanners sense a finger being swiping across the scanner and can be single line scanners, dual line scanners or multi-line scanners.

One example of a dual line scanner is disclosed in U.S. Pat. No. 6,002,815 issued to Immega et al. on Dec. 14, 1999 ("Immega"), the entire contents of which is herein incorporated by reference. The Immega dual line scanner must determine and track the velocity of the finger as it passes over the sensor and a 1×n pixel array scanner. The Immega dual line scanner performs 1×n linear array cross-correlation on current and historic line scans to initially image the fingerprint. The velocity of the finger must then be known in order to reconstruct the fingerprint image from the line scans.

Conventional fingerprint navigation methods require the velocity of the finger to be known. For example, United States Patent Application Publication No. 2010/0284565, entitled "Method and Apparatus for Fingerprint Motion Tracking Using an In-Line Array," published on Nov. 11, 2010, and United States Patent Application Publication No. 2008/0063245, entitled "Method and Apparatus for Fingerprint Motion Tracking Using an In-Line Array for Use in Navigation Applications," published on Mar. 13, 2008, each disclose matrix scanner arrays that image portions of a fingerprint and determine velocity and direction of movement with at least one linear array aligned to a direction of finger movement for user input navigation purposes.

Currently, a user input device (such as a mouse) uses various electrical and optical configurations to track the movement of the user's hand to control the position of a cursor on the screen or to click on icons or links. These can be cumbersome when a portable computing device is being used in a tight space, such as on an airplane, and inconvenient to carry along as an extra item. Built-in user input devices, such as are found on the casings of many lap-top and notebook computing devices, have been found to be difficult to use. Built-in user input devices often lack the feeling of smooth response to the application of pressure to the pressure plate and are often too large and cumbersome for use on mobile phones and handheld computing devices.

Thus, there is a need for a very compact user input device including a fingerprint scanner that can serve to manipulate the position of a cursor on the screen of a computing device.

SUMMARY OF THE INVENTION

A user input method and apparatus may comprise a two line object imaging sensor having a primary line scan-sensor providing a primary line scan-sensor output and a secondary line scan-sensor providing a secondary line scan-sensor output, representing pixels in a current primary scan row and a current secondary scan row, and adapted to scan an object; storing for each scan time each current primary line scan-sensor output and each current secondary line scan-sensor output and a correlation unit correlating at least one of the current representations of pixels in a primary line sensor output with stored representations and the current representations of pixels in a secondary line sensor output with stored representations and, the correlation unit providing as an output a motion indicator.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
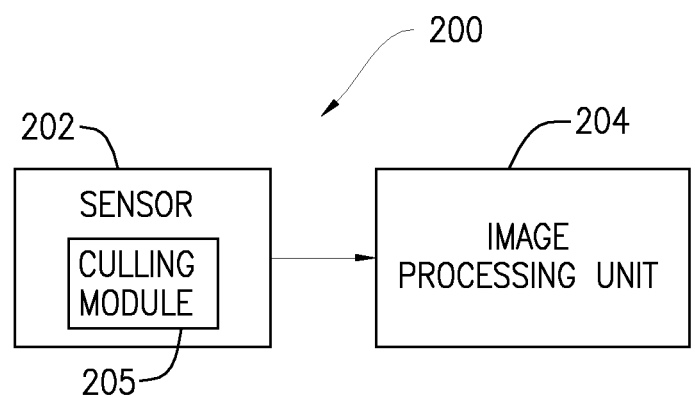
FIG. 1 is a schematic block diagram of a basic configuration for a fingerprint scanning and image reconstruction system according to embodiments of the present disclosure.

Before any embodiments of the invention are explained in detail, it is to be understood that the present disclosure is not limited in its application to the details of construction and the arrangement of components set forth in the following description or illustrated in the described drawings. The present disclosure is capable of other embodiments and of being practiced or of being carried out in various ways. Also, it is to be understood that the phraseology and terminology used in this application is for the purpose of description and should not be regarded as limiting. The use of "including," "comprising," or "having" is meant to encompass the items listed thereafter and equivalents, as well as additional items. Unless specified or limited otherwise, the terms used are intended to cover variations ordinarily known, now or in the future. Further, "connected" and "coupled" are not restricted to physical or mechanical connections or couplings and can include both physical and electrical, magnetic, and capacitive couplings and connections.

The following discussion is presented to enable a person skilled in the art to make and use embodiments of the present disclosure. The following detailed description is to be read with reference to the figures, in which like elements in different figures have like reference numerals. The figures depict selected embodiments and are not intended to limit the scope of embodiments of the present disclosure.

Figure 2:
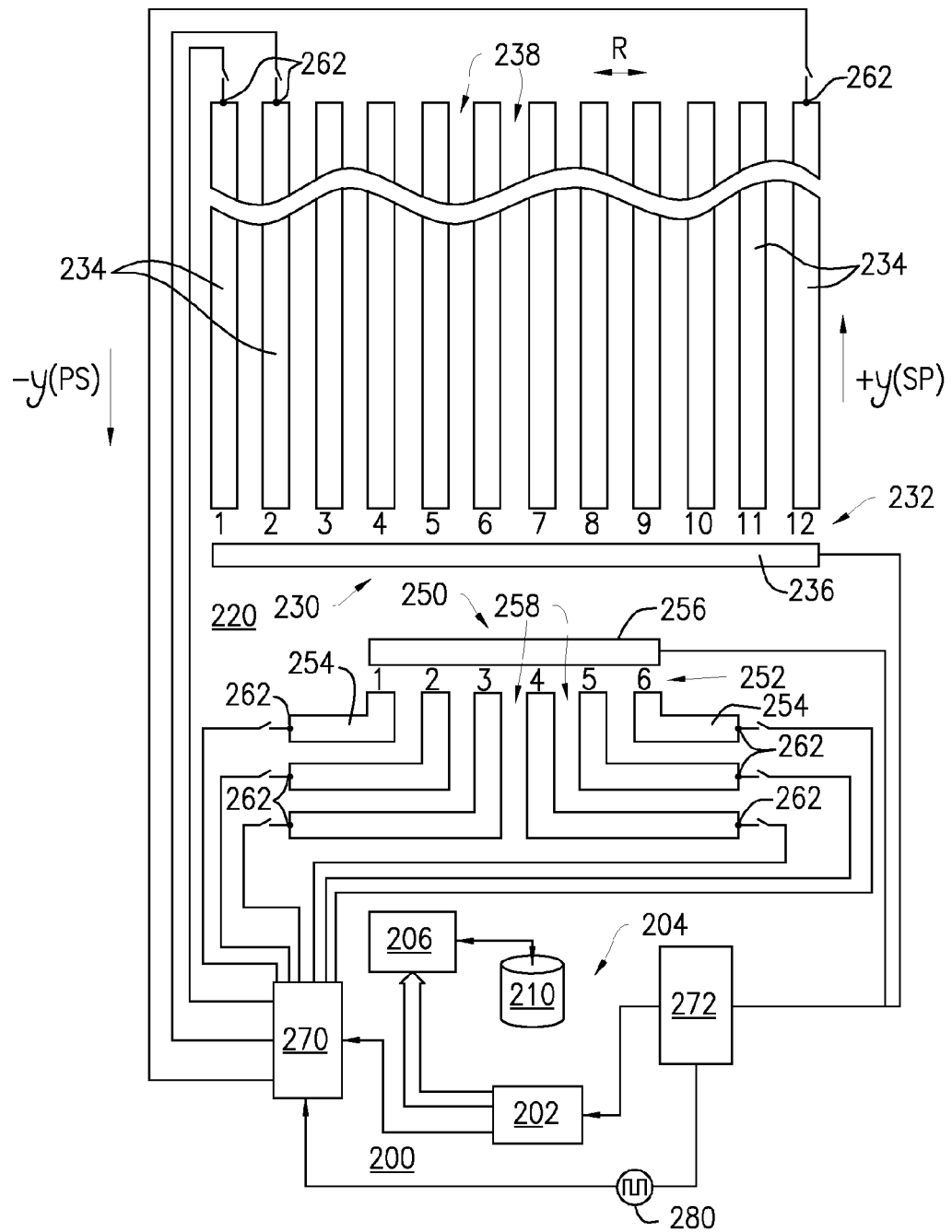
FIG. 2 is a schematic view, partly in block diagram form, of a dual line fingerprint scanner according to one embodiment of the present disclosure.

FIG. 1 schematically illustrates a fingerprint scanning and image reconstruction system 200 according to embodiments of the present disclosure. The fingerprint scanning and image reconstruction system 200 includes a sensor 202 and an image reconstruction module 204. The image reconstruction module 204 can be connected to or integrated with a host computing device 206 (as shown in FIG. 2) and can receive inputs from the sensor 202. The host computing device 206 can be connected to a database 210. In some embodiments, the sensor 202 can also include a culling module 205 to reduce the amount of data transmitted over the bandwidth of the communication links, whether wired or wireless, between the sensor 202, the image reconstruction module 204, and the host computing device 206. Culling is a technique for keeping line scans with very little variation from one clock time to the next clock time from being sent to the image reconstruction module 204 and/or the host computing device 206. If there is no change from one clock time to the next clock time, the finger is not moving with respect to the sensor 202. It is well understood in the art that such essentially redundant scan lines are not useful in image reconstruction.

FIG. 2 schematically illustrates a dual line fingerprint scanner 220 according to one embodiment of the present disclosure. The dual line scanner 220 includes a primary linear scanner segment 230 and a secondary linear scanner segment 250. The primary linear scanner segment 230 can be a 1×n linear pixel array, where n is typically 128-200 pixel scan points (for illustrative purposes, only 12 pixel scan points 232 are shown in FIG. 2). The secondary linear scanner segment 250 can be a 1×n linear pixel array, where n is about half of the number of pixels in the primary linear scanner segment 230 (e.g., about 64-100 pixel scan points 252, but with only 6 pixel scan points 252 being shown in FIG. 2).

Drive signals are supplied to each pixel scan point 232, 252 through leads 234, 254 across from reference voltage plates 236, 256 using a multiplexer 270, connected to the leads 234, 254 through contacts 262. The responses to the drive signals are influenced by capacitive couplings between the leads 234, 254 and the voltage plates 236, 256 at the pixel scan points 232, 252 as sensed by sensors 272. The capacitive couplings are influenced by whether the portion of the fingerprint being scanned at the pixel scan points 232, 252 is a ridge or a valley of the fingerprint. The output of each pixel scan point 232, 252 is a gray scale value from zero to 255. This is a convenient byte size data value range that is exemplary only and can be other values of gray scale granularity. Typically, the gray scale value of zero is white and the gray scale value of 255 is black, with intervening incremental shades of gray between these values. The image reconstruction module 204 can perform image reconstruction using these scan lines and the gray scale values to reconstruct the fingerprint with dark indicating ridges and light indicating valleys.

Each pixel scan point 232, 252 is provided VHF (20-80 MHz) signal bursts in sequence, at a very high clock rate, e.g. 40 MHz, as described, for example, in U.S. Pat. No. 7,099,496, entitled SWIPED APERTURE CAPACITIVE FINGERPRINT SENSING SYSTEMS AND METHODS, issued to Benkley on Aug. 29, 2006, the disclosure of which is hereby incorporated by reference. The signal bursts are provided from a multiplexer 270 to the scan points 232, 252 through respective leads 234, 254 having contacts 262. An output for each sequential lead 234, 254 and respective pixel scan points 232, 252 taken from the primary linear array scanner reference plate 236, and the secondary linear array scanner reference plate 256. The output for each sequentially sampled pixel scan point 232, 252 is influenced by a capacitive coupling between the respective lead 234, 254 and voltage plate 236, 256 at the respective pixel scan point 232, 252. The capacitive coupling depends upon whether, in the case of a finger, there is a fingerprint ridge or valley at the respective pixel scan point 232, 252. The leads 234, 254 may be provided the signal for a very short time period, e.g., 2-5 μsec, so that, compared to the speed of movement of the object, e.g., a finger, the scan is a linear single line across the object in the direction generally orthogonal to the object movement direction. The outputs can be sensed by a sensor 272 and sent to the host computer 206 by the sensor unit 202. Thus, each pixel scan point 232, 252 output for each pixel, is typically a gray scale value of from, typically 0-255, a convenient byte size data value range, which, it will be understood, is exemplary only and could easily be other values of gray scale granularity, e.g., up to about 12 bit resolution. Typically, also, the gray scale value of 0 is white and 255 is black with intervening incremental shades of gray between these values. Thus the host computing device 204 in the fingerprint imaging and reconstruction arrangement of the prior art can perform image reconstruction using these scanned lines and the gray scale value to form an image of the object, such as a finger, to reconstruct the fingerprint 10 with dark indicating ridges and light indicating valleys. Also various well known techniques can be used to sharpen edge contrast and the like to get a more faithfully the object reconstructed image of the fingerprint in the example where a finger is being scanned and a fingerprint being imaged.

The value of n in the primary linear scanner segment 232, such as 128, is the number of pixels in the x direction, with currently existing systems having around 128-200 pixels in the x axis. Leads 234, 254 of 25 μm in width with spaces 238, 258 in between the leads 234,254 of 25 μm gives a pitch R between the centerlines of the leads 234, 254 of 50 μm. The pitch determines the sensor's resolution in the x direction.

It will be understood, that, for purposes of illustrating the operation of the disclosed subject matter only, +y is chosen to be in the direction the movement of the object, such as the finger, as it moves first across the primary linear scan segment 230 and then across the secondary linear scan segment 250. Such orientation of the primary linear scan segment 230 and the secondary linear scan segment 250 and finger movement, is not intended to be limiting. Indeed, the system 200 operates whether the finger moves in the just oriented +y direction or in the −y direction, and on certain kinds of user devices for which the disclosed subject matter can be utilized to provide user input, the user may not always swipe the finger in the "right" direction, yet the system can determine the direction of movement, as is explained in more detail in the present application. Indeed, the +y direction as oriented to the plane of the paper on which FIG. 2 appears is "down" rather than "up." "Up," as used in the present application, unless otherwise clearly stated, shall mean +y direction and "down" shall mean −y axis direction, with the +y axis direction extending from the primary scan portion 230 to the secondary scan portion 250.

Figure 3:
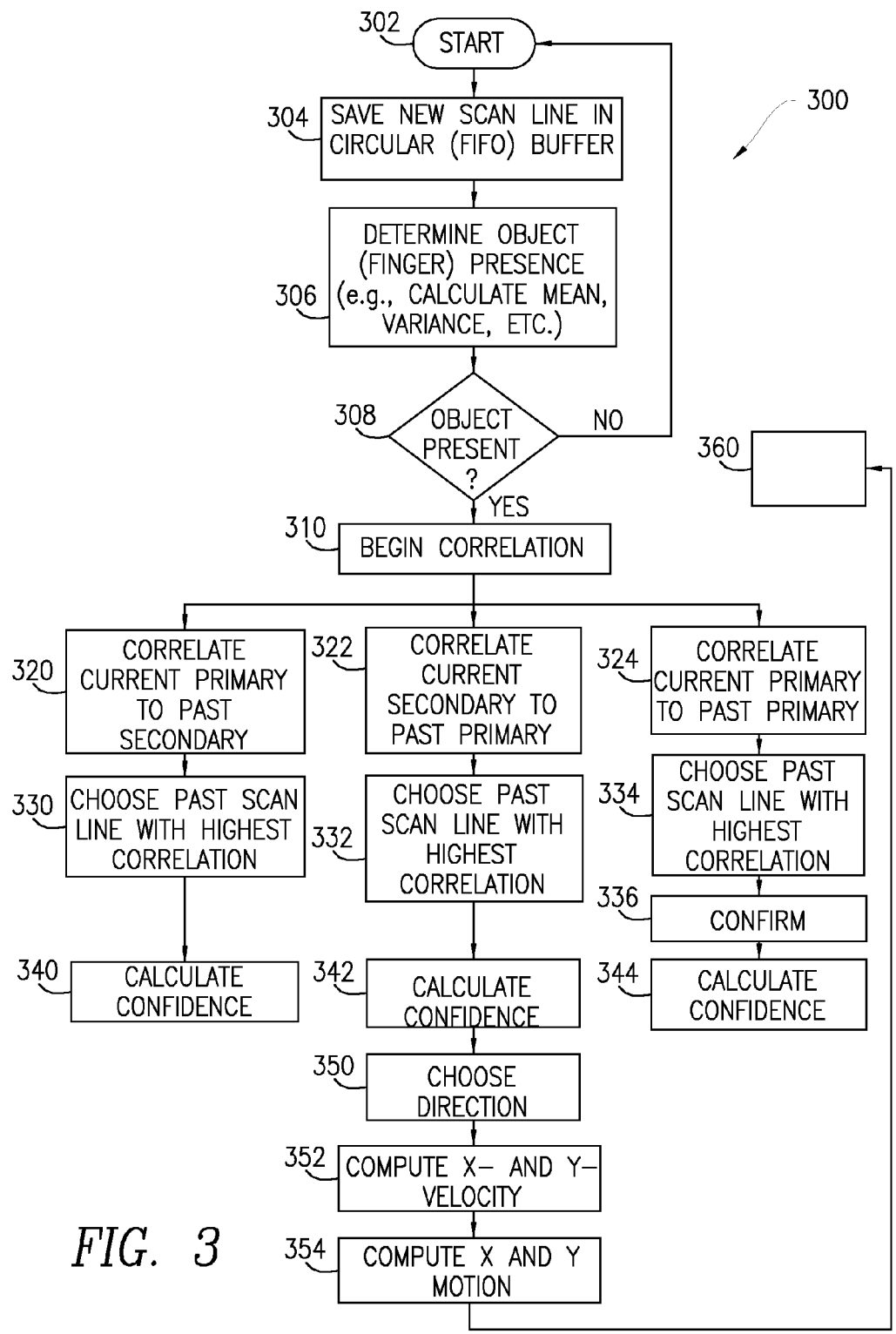
FIG. 3 is a flow diagram for a user input device according to one embodiment of the present disclosure.

Applicant has determined that this same basic object (i.e., finger) scanning and image (i.e. fingerprint) regeneration system 200 can be the basis for a very compact and miniaturized computing device user input, as will be explained in regard to possible embodiments of the disclosed subject matter. Turning now to FIG. 3 there is shown a block diagram of a process 300 flow that can be utilized according to aspects of the disclosed subject matter. The process starts at START and in block number 304 a save a new scan line in circular buffer 210 step occurs. The buffer 210 may be a "first in first out storage," such as a circular buffer 210, shown in FIG. 2, which can have any selected number of buffer locations (not shown), such as, 8, 16, 32 or so forth. A 16-row buffer is used in the preferred embodiment. However, an illustrative buffer with 8 locations is described in relation to an embodiment of the disclosed subject matter. The data that has been in a respective primary scan line and secondary scan line circular buffer, representing a single line scan by the primary linear scan array 230 and the secondary linear scan array 250, respectively, for the longest time will be dropped from the respective circular buffer 210 as a new scan line is entered into the circular buffer 210, when the buffer 210 is full.

A determine if the object (finger) is present step is performed in block 306 of the process 300. Various ways are known in the art of performing this step, such as calculating a mean, a variance and the like, or combinations of these. If the finger is not present as determined in block 308, then the process 300 returns to the START. If the finger is present as determined in block 308 then in block 310 correlation begins.

To make the navigation algorithm work most reliably to track finger motion, it is necessary to decide if a finger is likely to be on the sensor at the time that it is trying to be tracked. Also it is necessary to know if the finger is in contact with enough pixels of the primary and/or secondary line to yield a correlation value with high-enough confidence level. Such a "finger detect" operation preferably can be done before correlation to save the computing of the correlations if an object, such as a finger, is not there. Culling itself can't distinguish between a non-moving finger on the sensor and no finger at all.

There are many methods of doing this. A preferred embodiment can calculate the variance of the gray level pixels in a subset of either or both of the secondary and primary scan lines 230, 250. If that variance is below a threshold, no finger is detected. If it is above a threshold, a finger is detected. A preferred embodiment analyzes the variance in two subsets (left half and right half) to ensure both halves have a finger on either or both of the primary and secondary scan lines 230, 250 (each half's variance must be above some threshold). Other ways to do this in software can be to analyze zero crossings of the pixels in the line, or the frequency content of the gray levels along the line, or combinations of both. In hardware finger detect could be done through a micro-switch or other pressure-sensitive means, optically (blocking a light source with the finger), or electrically (measuring a bulk capacitance and/or resistance of the finger).

In blocks 320, 322 and 324 respectively, various correlations are performed, the nature of which is explained by truncated illustrative example with respect to FIG. 4 below. In block 320 the current primary scan line is correlated to past secondary scan lines contained in the circular buffer 210 in an attempt to sense downward movement, i.e., in the +y-axis direction of the object being sensed, such as a finger, moving with respect to the primary linear scan array 230 and the secondary linear scan array 250. That is, a line of the object extending along the x-axis, generally perpendicular to the longitudinal axis of each of the primary linear scan array 230 and the secondary linear scan array 250, passed over the primary linear scan array 230 before passing over the secondary linear scan array 250. When the object (i.e., the finger) is so scanned, correlation of the current primary scan line obtained from the primary linear scan array 230 with one of a plurality of secondary linear scan lines obtained from the secondary linear scan array 250, and stored in the secondary scan line circular buffer 210, can show that a finger is swiping in a +y axis direction ("down" in relation to the illustrated orientation of FIG. 2).

In block 322 the current secondary scan line can be correlated to past primary linear scan lines in the primary linear scan line circular buffer 210 in an attempt to sense −y axis direction movement of the object being sensed, such as a finger, moving with respect to the primary linear scan array 230 and the secondary linear scan array 250 (in this case "up" as viewed in FIG. 2. That is, a line of the object extending along the x-axis, generally perpendicular to the longitudinal axis of each of the primary linear scan array 230 and the secondary linear scan array 250, passes over the secondary linear scan array 250 before passing over the primary linear scan array 230. When the object (i.e., the finger) is so scanned correlation of the current secondary scan line from the secondary linear scan array 250 with one of a plurality of primary scan lines from the primary linear scan array 230, stored in the primary scan line circular buffer 210, can show that a finger is swiping in a (−y axis direction), crossing the secondary linear scan line segment 250 first and then the primary linear scan line segment 230 (though "up" in FIG. 2).

In block 324 the current primary scan line 230 is correlated to the immediately past primary scan line 230, which is stored in buffer 210, which contains past primary and secondary lines. Therefore the buffer 210 also contains the immediately past primary line, which would be the most recent one added to the circular buffer. This correlation is performed in an attempt to sense purely sideways movement in the x-axis direction of the object being sensed, such as a finger, moving with respect to the primary linear scan array 230. That is, when the object (i.e., the finger) is so scanned, correlation of the current primary scan line with the immediate past primary scan line, can show that a finger is swiping in a sideways direction (±x axis direction only, i.e., there is also no corresponding movement in the +y or −y directions).

It will be understood that the foregoing is exemplary only and many modifications will be understood by those skilled in the art, such as accounting for half pixel registration of the purely sidewise movement, so that the current primary scan line may be compared to several immediate past primary scan lines, each kept in the primary scan line circular buffer for y axis direction correlation, to detect a pixel aligned correlation with a second or third most recent primary scan line. It will also be understood that the secondary scan line could be suitably used for this sidewise motion detection, either as an alternative or a verification or as supplying added data.

In blocks 330, 332 and 334 the process 300 may choose the past secondary scan line with the highest correlation to the current primary line (block 330), choose the past primary scan line with highest correlation to the current secondary line (block 332) and choose the past primary scan line with highest correlation to the current primary line (block 334). In block 336, the choice of the past primary with the highest correlation may be confirmed, e.g., by, as noted above, calculating a secondary scan line to an immediate past secondary scan line(s) at the same x-lag chosen in block 336. Confidence may then be calculated in blocks 340, 342 and 344, which may be done by comparisons of the current correlation measure with past correlation measures, or, in the case of the sidewise motion (blocks 334, 336) the secondary to secondary correlation mentioned for block 336.

In block 350 the process 300 chooses a direction, up, down or sideways from the highest correlation confidence measure, which is the direction of the motion of the object, such as the finger. This may involve some choice algorithms, such as when there is no clear correlation measure that can be selected from either one or both of the other two confidence measures. Such choice algorithms could rely on past results, e.g., the object was moving up so assume that up is the right answer. Or, if none of the correlations are above a threshold, declare that no finger motion has occurred. Other algorithms for improving choice accuracy may be used as well, such as, those described in further detail below.

In block 352 the process 300, based on a corresponding time lag for the y-lag (in the case of up/down movement), may determine a y-velocity, e.g., based on timestamps, as is well known in the art. Similarly as explained illustratively with respect to FIG. 4 an x-velocity can be determined, e.g., based on the x-lag and the same determined time difference. In block 354 a motion in the x and y directions may then be computed based on the calculated x and y velocities and elapsed time since the last processed current primary linear scan array 230 and secondary linear scan array 250 scan line. Such a motion event may be stored in an event buffer 360 as an entry onto an event list equal to the computed x and y motion, as is further explained below in regard to FIG. 5. The event list may then be processed and any event that has matured can be sent to a calling program, such as 420 shown in FIG. 5.

In an alternate embodiment, the velocity calculation step 352 may be omitted entirely and motion may be calculated directly as a function of the x-lag and y-lag. For the y-lag, this function would be an inverse proportion. For instance, if the y-lag is smaller than the y-motion would be larger because the finger must be moving very quickly to have traversed from the primary to the secondary in a small number of scan lines. The corresponding x-motion would simply be a straight proportion of the calculated x-lag. Using this method, velocities need not be calculated and timestamps are not necessary. This is illustrated in more detail in a co-pending application filed on the same date as the present application and assigned to the assignee of the present application, entitled SYSTEM FOR AND METHOD OF IMAGE RECONSTRUCTION WITH DUAL LINE SCANNER USING LINE COUNTS, by Russo, application Ser. No. 13/014,389 filed Jan. 26, 2011, published as US2012/0189172 A1 on Jul. 26, 2012, the disclosure of which is hereby incorporated by reference.

Correlation may be illustrated schematically by considering FIG. 4. Correlation is actually done differently in a current actual embodiment of the disclosed subject matter as explained below, for various reasons, such as computational time and memory capacity limitations, but could be implemented in the way illustrated in FIG. 4. FIG. 4 in any event illustrates the intent of correlation, such as cross-correlation, in the disclosed subject matter. Turning to FIG. 4, as illustrated in 5a, a primary linear scan array 230 line scan 370, e.g., taken from the schematically illustrative scanner 220 of FIG. 3, can be compared to a secondary linear scan array 250 scan line 372. In FIG. 4a, the six pixels of the scan line 372 are compared to the first six pixels in the scan line 370. It will be understood that the scan line 370 could be a current scan line and the secondary scan line 372 could be a past scan line from the secondary scan line circular buffer 210 or vice versa.

Various comparison algorithms can be used, depending in part on the size of the primary scan line 370, i.e., number of pixel locations available for comparison, and the size of the secondary scan line 372. For example, matching of four out of six of the secondary scan line 372 pixel locations with the portion of the primary scan line 370 pixel locations being compared, or four consecutive such pixels, or the like can be employed.

Each of the different symbols in the individual pixel locations, 12 for the primary scan line 370 and six for the secondary scan line 372, represents a different value, e.g., a gray scale value for the respective pixel location sensed by the dual line scanner 220. It will also be understood that for this exemplary implementation of cross correlation, due to noise in the system, the individual values represented by the different symbols may have to be flexibly valued within some range. That is, the symbol in a pixel location of the primary pixel line 370 may not have to be identical to that of the corresponding pixel location in the secondary pixel scan line 372 for each comparison.

Figure 4A:
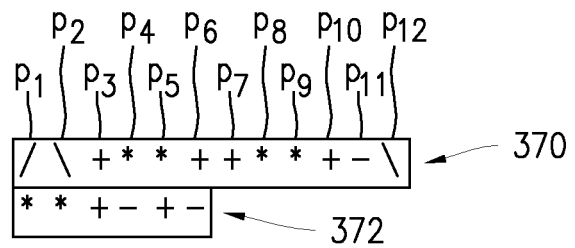
FIGS. 4*a-g* are schematic illustrations of a cross correlation technique according to one embodiment of the present disclosure.
Figure 4B:
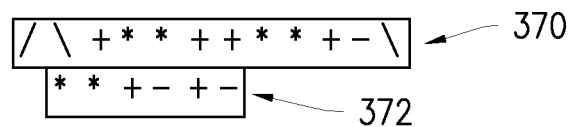
Figure 4C:
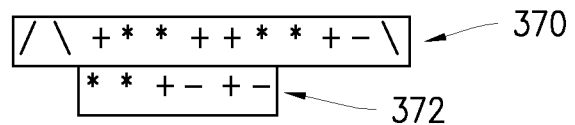
Figure 4D:
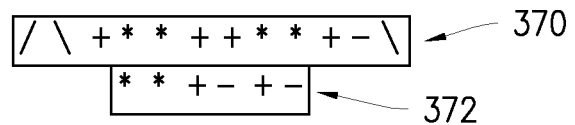
Figure 4E:
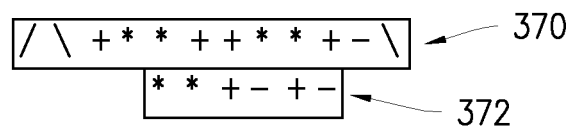
Figure 4F:
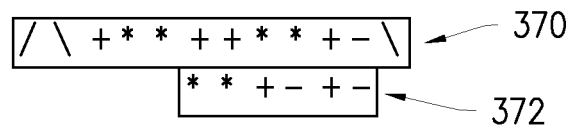
Figure 4G:
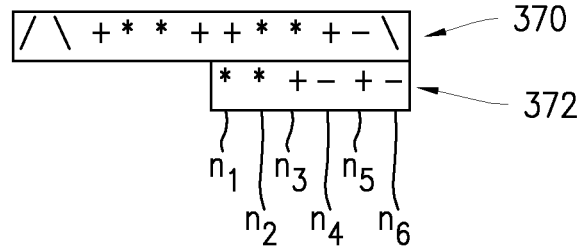

Assuming, for illustration, either a noiseless system or that each of the individual symbols used in FIG. 4 for the pixel values are not within such range of values from any other, i.e., a match requires a same symbol be matched for all of the different symbols shown in FIG. 4, then, as can be seen, there is no correlation between the first six pixel locations of the secondary scan line 372 and the primary scan line 370 in the position illustrated in FIG. 4a. There the initial register locations of the initial pixels in each of the primary scan line 370 and the secondary scan line 372 are aligned and there is no match of four out of six or four adjacent pixel locations. The same applies for FIG. 4b, where the secondary initial scan line pixel location $s_1$ is aligned with the primary scan line pixel location $p_2$. In fact, the same situation prevails through each of FIGS. 4c, 4d, 4e and 4f until FIG. 4g. There, with the secondary scan line 372 pixel location $s_1$ aligned with primary scan line 370 pixel location $p_8$ the first four symbols in the secondary pixel scan line 372, $s_1$-$s_4$ are the same as the four adjacent primary scan line 370 pixel locations $p_8$-$p_{11}$.

Given this cross correlation, the system can determine along in a particular direction (x and y) depending on whether the primary scan line 370 or the secondary scan line 372 is a current scan line and the opposite one is taken from the respective scan line buffer, which equates to the difference between the current scan line and the position of the historical scan line in the respective buffer. That is, as an example, an 8 line separation would be a separation of 400 μm and would have a time difference based upon time stamp comparison. Assuming the secondary scan line 372 is the current scan line in the comparison, this would be a y-lag in the +y axis direction. In addition it can be seen that there is a lag in the +x-axis direction of 8 pixel locations. This would amount to 400 μm, given a pitch of 50 μm as noted above for the pixel locations in the primary linear array scan line 230 and the secondary linear scan line array 250.

While FIG. 4 is illustrative of a correlation process that could be employed and the objective of such correlation, other mathematical approaches to cross correlation are much easier to implement and even more effective, including normalized cross correlation ("NCC") as discussed in more detail below.

Figure 5:
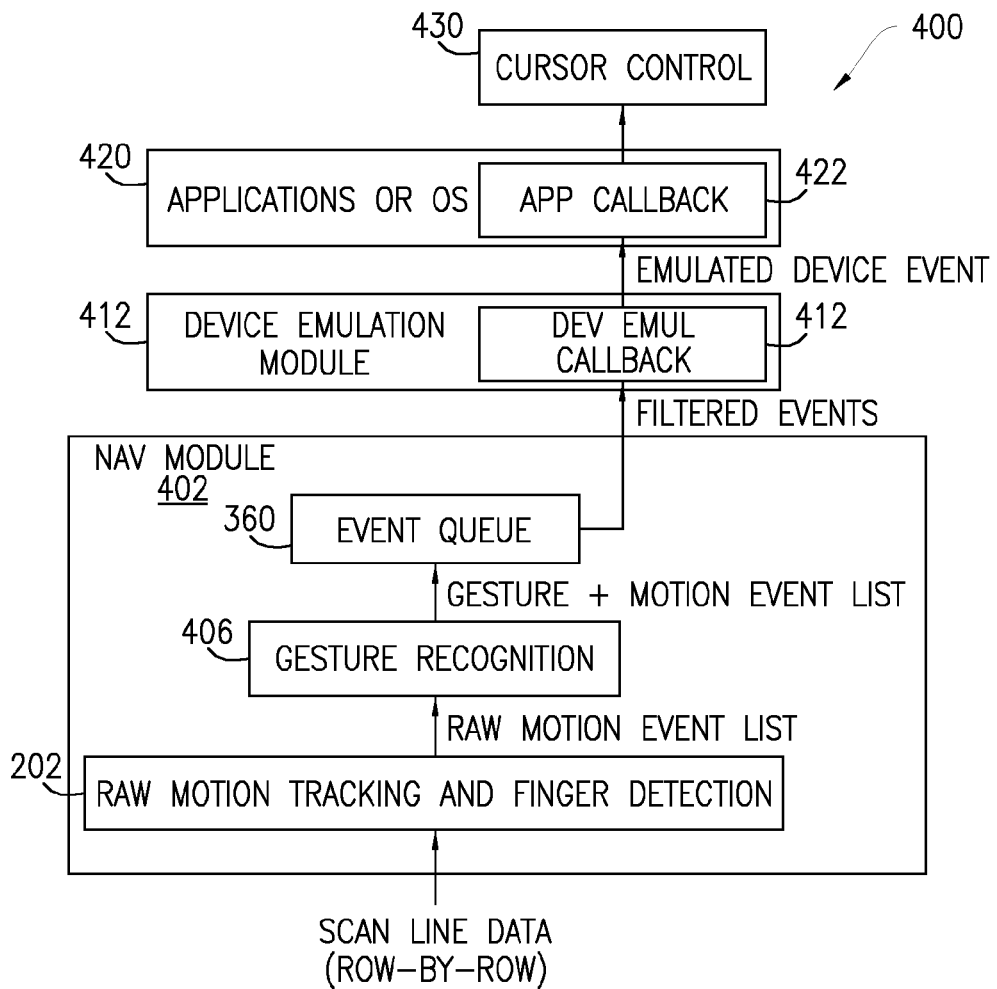
FIG. 5 is a schematic block diagram of a user input device according to one embodiment of the present disclosure.

Turning now to FIG. 5 which illustrates schematically and in block diagram form, according to aspects of embodiments of the disclosed subject matter, an architecture of a user input device 400, which can include a navigation system module 402, and further can include a device emulation module 410. The user input device 400 navigation module can include a gesture recognition unit 406 and the motion tracking system 202 of the object imaging and image reconstruction system 200 as described above. As seen in FIG. 5, in an object imaging and image reconstruction system 200 motion tracking module 204 the host computer 202 of FIG. 2 consumes sensor rows one scan line at a time, as received from the sensor 220 of FIG. 2 for both the primary scan line 230 and the secondary scan line 250. The motion tracking module 202 can calculate an estimate of the raw finger motion relative to the sensor 220 surface, as is explained in the present application, and accumulate an output event queue 360, which can contain ΔX and ΔY values, which may be time-stamped, along with finger on/off status.

Gesture recognition in a gesture recognition module 406 can be integrated into motion tracking, and can consume a motion event list every G milliseconds, while the module 406 attempts to determine if a gesture has occurred. The module 406 may then characterize any gesture(s) it finds and append all gesture events to the output event queue 360. Every N milliseconds events in the output event queue 360 whose "time has come" can be sent via device emulation callback 412 to the device emulation module 410, which can consume these motion and gesture events and produce as outputs on-screen behavior 430 through an application or an operating system 420, having an application callback 422, according to the device under emulation. Similarly, device emulation 410 can create its own output event (i.e., no queuing being used) and immediately send the output event to the calling program 420.

Motion tracking is at the heart of the navigation task. For gestures and device emulation to work well, good estimates of actual finger motion are required. Motion tracking, as noted, employs correlation, and more specifically in an example of an embodiment of the disclosed subject matter normalized cross-correlation (NCC), to determine when a finger has moved vis-a-vis the primary linear scan array 230 and/or the secondary linear scan array 250. NCC can be the choice because it is very robust to noise and changes in DC level.

As explained in regard to FIG. 3, three sets of data are correlated, current primary scan line to past secondary scan lines for −y axis motion; current secondary scan line to past primary scan lines for +y axis motion; and current primary scan line to past primary scan lines for sideways motion. The atomic datum is one scan line. The algorithm can operate on non-culled scan lines, since culled lines are not sent to the host computing device 204 in order to reduce bandwidth over the bus, although the navigation module 402 could implement its own culling or improve on the culling done by the sensor module 202. Once an input scan line is processed and its movement calculated, the navigation module 402 may be set up to not revisit the scan line movement, e.g., based on results for future scan lines, though such is possible and could improve fidelity. When the navigation module 402 is called with a new non-culled row, the simplified processing flow is as is shown in FIG. 3.

The correlation algorithm, discussed above, being mathematically well-known, having no tunable parameters and consuming over 95% of the processing can preferably be implemented in a hard wired hardware implementation. Each new scan line that is not-culled, i.e., is delivered to the host computing device 204, must be correlated to older scan lines saved in the circular buffer(s) 210. As an example 64 rows of history, i.e., 64 past primary line scans 230 and 64 past secondary scan lines 250 in respective 48 place circular buffers 210 can be used, but also as little as 48 or even 32 total may be enough, especially with improved culling techniques.

A possible configuration can be to use 48 rows of 4-bit data, i.e., using the middle 128 pixels of a 256 pixel primary linear scan array 230 and the entire 64 pixels of a secondary linear scan array 250. This would require a RAM buffer space equal to 48×(128+64)×0.5=4.6 KB. Having 128 primary pixels with a 64-pixel secondary pixels can allow for +/−32 column-wise shifts (lags), whereas an alternative of 112 primary pixels can accommodate +/−24 column-wise shifts. The number of the pixels in the secondary scan line 250 is believed to be less susceptible to modification.

With regard to timing considerations, worst-case is that the finger is moving so fast as to have no lines culled at that moment, which means that to be in real time the system must complete tasks within the time to do a single scan. This could be, as an example, 250 μsec, but 330 μsec or longer could also be acceptable. Without any optimizations to reduce correlation set search space, the system will need to correlate 3 sets of data at each iteration, i.e., the current primary to all (48) stored secondary lines (for −y direction motion), the current secondary to all (48) stored primary lines (for +y direction motion) and the current primary to 2 or 3 most recently stored primary lines (for purely horizontal motion tracking).

The total 48+48+2=98 rows need to be correlated in the preferred embodiment. Each row's correlation can use 64 pixels and needs to be computed over a number of different shifts or lags, which is required to track angles above or below 90 degrees (pure vertical). The larger the maximum lag that is allowed for, the wider the deviation from pure vertical that can be successfully tracked. The primary-to-primary correlation can only track pure horizontal motion. A lag range of +/−16 could be used, along with a prediction of the next lag, from the lag history, combined with centering the lag range on the predicted value, or even on the last computed value, as a possibility. Alternatively, a wider range may be used, e.g., +/−24 instead, and centering on the center of the secondary scan line is possible. Using this number, 24+24+1=49 NCC values that would need to be calculated per row. The total number of NCC calculations per new scan line, without the above noted possible optimizations, is, therefore, 49×98=4802.

The classic equation for a single NCC calculation for a given lag is:

$$NCC=[E(q\text{Ref}*q\text{Test})-E(q\text{Ref})E(q\text{Test})]/[\sigma(q\text{Ref})*\sigma(q\text{Test})] \quad (i)$$

where qRef is the set of pixels in the secondary scanline, qTest is the shifted set of pixels used in the primary scanline, E(q) is the expected value of the set of pixels in q, and σ(q) is the standard deviation of the set of pixels in q. Because standard deviations require square roots, it can be helpful to use the squared-NCC value to simplify the equation. Other straightforward simplifications can include elimination of most of the divisions. The navigation algorithm equation for a given lag being considered (i.e., a respective shift between the secondary set of pixels with respect to the primary set of pixels) then becomes:

$$NCC^2=[N*\Sigma(q\text{Ref}*q\text{Test})-\Sigma(q\text{Ref})*\Sigma(q\text{Test})]^2/([N*\Sigma(q\text{Ref}*q\text{Ref})-\Sigma(q\text{Ref})*\Sigma(q\text{Ref})]*[N*\Sigma(q\text{Test}*q\text{Test})-\Sigma(q\text{Test})*\Sigma(q\text{Test})]) \quad (ii)$$

where N=64 and all sums are from 1-64.

Choosing among the three correlation scores for the one most likely to represent true motion, i.e., correlation set choice, according to aspects of an embodiment of the disclosed subject matter, involves three correlation peaks to choose from: primary-to-past-secondaries (CorrUP, i.e., +y axis motion), secondary-to-past-primaries (CorrDOWN, i.e. −y axis motion), and primary-to-past-primaries (CorrSIDE), in a preferred embodiment using primary-to-past-primaries because the number of pixel locations is larger and hence more reliable.

The following logic may be used: If CorrUP>CorrDOWN+Margin_updown and CorrUp>CorrSIDE+Margin_side and CorrUp>Thresh_updown, then the finger moved upward (+y direction). In other words, CorrUP must be significantly greater than CorrDOWN and CorrSIDE, and must also be greater than a selected threshold. Similarly if CorrDOWN>CorrUP+Margin_updown and
CorrDOWN>CorrSIDE+Margin_side and
CorrDOWN>Thresh_updown then the finger moved downward (−y axis direction motion). Finally if
CorrSIDE>CorrUP+Margin_side and
CorrSIDE>CorrDOWN+Margin_side and
CorrSIDE>Thresh_side then the finger moved sideways.

Typically, Margin_updown is greater than zero and, if correlation values are said to range between 0-100, then Margin_updown is typically 0<Margin_updown<50. Margin_side is typically less than zero because it has been found that, in general, side-to-side correlations tend to be higher than up-down correlations. This is because the data being correlated is coming from the same part of the sensor (e.g. primary to primary) versus up-down where it's a primary against a secondary. So, typically −25<Margin_side<0, but this could differ with sensing hardware.

As noted above, NCC is not the only way to measure the similarity of two scan lines, with nearly equivalent measures, i.e., mean-squared-error (MSE) and sum-of-absolute-differences (SAD) as possible substitutes. While they may be computationally slightly less complex than NCC after the just noted optimizations, perhaps they can be easier to implement in hardware. If so, accuracy impact may be the determining factor in the choice.

Embodiments of the present disclosure can be used to scan objects other than fingers and to create images of such objects other than fingerprint images. The present disclosure can be used to scan other biometric data, such as the palm of a hand or a retina. The present disclosure can also be used to scan virtually any type of object by a swipe scan without having to calculate the velocity of the object as it moves across the swipe scanner.

The present disclosure is described with reference to block diagrams and operational illustrations of methods and devices implementing methods (collectively "block diagrams"). Each block of the block diagram, and combinations of blocks in the block diagram, can be implemented with analog or digital hardware and/or computer program instructions, such as in a computing device. The computer program instructions can be provided to a processor of a general purpose computer, special purpose computer, microcontroller, ASIC, or any other programmable data processing apparatus, so that the instructions implement the functions/acts specified in the block diagram when executed via the computing device. The functions/acts noted in the blocks can occur out of the order noted in the block diagram. For example, two blocks shown in succession can in fact be executed substantially concurrently or the blocks can sometimes be executed in the reverse order, depending upon the functionality/acts involved. In addition, different blocks may be implemented by different computing devices, such as an array of processors within computing devices operating in series or parallel arrangement, and exchanging data and/or sharing common data storage media.

The term "computer readable medium" as used herein and in the claims generally means a non-transitory medium that stores computer programs and/or data in computing device machine-readable form. Computer readable medium can include computer storage media and communication media. Computer storage media can include volatile and non-volatile, removable and non-removable media implemented with any suitable method or technology for the storage of information, such as computer-readable instructions, data structures, program modules, or specific applications.

The term "module" as used herein and in the claims generally means a software, hardware, and/or firmware system, process and/or functionality that can perform or facilitate the processes, features, and/or functions of the present disclosure, with or without human interaction or augmentation. A module can include sub-modules. Software components of a module can be stored on a non-transitory computing device readable medium. Modules can be integral to one or more servers or can be loaded and executed by one or more servers. One or more modules can be grouped into an engine or an application.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The invention claimed is:

1. A user input apparatus comprising:
a two line object imaging sensor having a primary line scan-sensor providing a primary line scan-sensor output and a secondary line scan-sensor providing a secondary line scan-sensor output, each representing, respectively, the pixels in a current primary scan row of pixels and a current secondary scan row of pixels, the primary line scan-sensor and the secondary line scan-sensor each adapted to scan an object;
a storage apparatus storing a selected portion of a current primary line scan-sensor output to maintain a plurality of stored representations of the current primary line scan-sensor output and a plurality of past primary line scan-sensor outputs and storing a selected portion of a current secondary line scan-sensor output to maintain a plurality of stored representations of the current secondary line scan-sensor output and a plurality of past secondary line scan-sensor outputs;
a correlation unit configured to correlate at least one of the representation of the current primary line scan-sensor output with respective ones of the plurality of representations of past secondary line scan-sensor outputs and the representation of the current secondary line scan-sensor output with respective ones of the plurality of representations of past primary line scan-sensor outputs to find a respective match; and,
the correlation unit configured to provide as an output a motion indicator comprising an amplitude of the motion of the object being scanned in a coordinate system coplanar with the primary and secondary line scan-sensors and aligned to the primary line scan sensor and the secondary line scan-sensor, based at least in part on at least one of (1) a temporal separation of the primary line scan-sensor output and the secondary line scan-sensor output found to match or (2a) a line count between the primary line scan-sensor output and the secondary line scan-sensor output found to match and (2b) a spatial separation between the primary line scan sensor and the secondary line scan-sensor.

2. The user input apparatus of claim 1 further comprising:
the correlation unit configured to correlate according to an individual pixel location matching algorithm at each corresponding pixel location for each of one or more pixel shifts between the one of the current representation of the primary line scan-sensor output and the respective one of the plurality of representations of the past secondary line scan-sensor outputs and the current representation of the secondary line scan-sensor output and the respective one of the plurality of representations of the past primary line scan-sensor outputs.

3. The user input apparatus of claim 1 further comprising:
the correlation unit configured to correlate according to a full line statistical analysis of each of the one of the current representation of the primary line scan-sensor output and the respective one of the plurality of representations of the past secondary line scan-sensor outputs and the current representation of the secondary line scan-sensor output and the respective one of the plurality of representations of the past primary line scan-sensor outputs, for each respective pixel shift.

4. The user input apparatus of claim 1 further comprising:
the full line statistical analysis comprising one of normalized cross correlation, mean-squared-error and sum-of-absolute-differences.

5. The user input apparatus of claim 2 further comprising:
the correlation unit configured to provide an output of a motion indicator comprising a direction of motion of the object being scanned based at least in part on the pixel shift necessary to find the match.

6. The user input apparatus of claim 1 further comprising:
the correlation unit configured to provide the output of a motion indicator comprising a direction of motion of the object being scanned based at least in part on whether the match is made with the representation of the current primary line scan-sensor output or the representation of the current secondary line scan-sensor output.

7. The user input apparatus of claim 2 further comprising:
the correlation unit comprising a logic circuit configured to:
receive a selected portion of the current primary line scan-sensor output selected to comprise a representation of the primary line scan-sensor output,
store a plurality of representations of the primary line scan-sensor output,
receive a selected portion of the current secondary line scan-sensor output selected to comprise a representation of the secondary line scan-sensor output,
store a plurality of representations of the primary line scan-sensor output,
compare the representation of the current primary line scan-sensor output with a respective one of the plurality of stored representations of the secondary line scan-sensor output, for each of a selected one or more pixel shifts between the representation of the current primary line scan sensor output and the respective one of the plurality of stored representations of the secondary line scan-sensor output, for a selected number of stored secondary line scan-sensor outputs, to determine if a match can be found,
compare the representation of the current secondary line scan-sensor output with a respective one of the plurality of stored representations of the primary line scan-sensor output, for each of a selected one or more pixel shifts between the representation of the current secondary line scan-sensor output and the respective one of the plurality of stored representations of the primary line scan-sensor output, for a selected number of stored primary line scan-sensor outputs, to determine if a match can be found,
identify the current primary line scan-sensor output and the respective one of the secondary line scan-sensor outputs or the current secondary line scan-sensor output and the respective one of the primary line scan-sensor outputs for which the match exists and the respective pixel shift resulting in the match.

8. The user input apparatus of claim 3 further comprising:
the correlation unit comprising a logic circuit configured to:
receive a selected portion of the current primary line scan-sensor output selected to comprise a representation of the primary line scan-sensor output,
store a plurality of representations of the primary line scan-sensor output,
receive a selected portion of the current secondary line scan-sensor output selected to comprise a representation of the secondary line scan-sensor output,
store a plurality of representations of the primary line scan-sensor output,
align the representation of the current primary line scan-sensor output with a respective one of the plurality of stored representations of the secondary line scan-sensor output, at a pixel shift location for the alignment, for each of a selected one or more pixel shifts between the representation of the current primary line scan-sensor output and the respective one of the plurality of stored representations of the secondary line scan-sensor output, for a selected number of stored representations of the secondary line scan-sensor output, and provide the alignments to a computing device configured to determine if a match can be found utilizing the full line statistical analysis; and
align the representation of the current secondary line scan-sensor output with a respective one of the plurality of stored representations of the primary line scan-sensor output, at a pixel shift location for the alignment, for each of a selected one or more pixel shifts between the representation of the current secondary line scan-sensor output and the respective one of the plurality of stored representations of the primary line scan-sensor output, for a selected number of representations of the stored primary line scan-sensor output, and provide the alignments to a computing device configured to determine if a match can be found utilizing the full line statistical analysis.

9. The user input apparatus of claim 1 further comprising:
the correlation unit configured to correlate at least one of the representation of the current primary line scan-sensor output and a stored representation of a primary line scan-sensor output or the current secondary line scan-sensor output and a store representation of a secondary line scan-sensor output;
the correlation unit configured to assign a correlation score to each correlation for the representation of the current primary line scan-sensor output and the respective ones of the representations of the stored secondary line scan-sensor output and to save the highest score as a CorrUP correlation score and to assign a correlation score to each correlation of the representation of current secondary line scan-sensor output and the representations of the stored representations of the stored primary line scan-sensor output and to save the highest score as a CorrDOWN score, and to assign a correlation score to each correlation of either the current representations of the current primary line scan-sensor output and a representation of a stored primary line scan-sensor output of the representations of the current secondary line scan-sensor output and a representation of a stored secondary line scan-sensor output, and to save the highest score as a CorrSIDE; and computing device configured to determine a direction of motion of the object based on the correlation scores CorrUP, CorrDOWN and CorrSIDE.

10. A method of providing a user input comprising:
providing, via a two line object imaging sensor having a primary line scan-sensor a primary line scan-sensor output, and having a secondary line scan-sensor, a secondary line scan-sensor output, each representing, respectively, the pixels in a current primary scan row of pixels and a current secondary scan row of pixels, the primary line scan-sensor and the secondary line scan-sensor each adapted to scan an object;
storing in a storage apparatus a selected portion of a current primary line scan-sensor output to maintain a plurality of stored representations of the current primary line scan-sensor output and a plurality of past primary line scan-sensor outputs and a selected portion of a current secondary line scan-sensor output to maintain a plurality of stored representations of the current secondary line scan-sensor output and a plurality of past secondary line scan-sensor outputs;
correlating, via a correlation unit, at least one of the representation of the current primary line scan-sensor output with respective ones of the plurality of representations of past secondary line scan-sensor outputs and the representation of the current secondary line scan-sensor output with respective ones of the plurality of representations of past primary line scan-sensor outputs to find a respective match; and,
the correlation unit providing as an output a motion indicator comprising an amplitude of the motion of the object being scanned in a coordinate system coplanar with the primary and secondary line scan-sensors and aligned to the primary line scan-sensor and the secondary line scan-sensor, based at least in part on at least one of (1) a temporal separation of the primary line scan-sensor output and the secondary line scan-sensor output found to match or (2a) a line count between the primary line scan-sensor output and the secondary line scan-sensor output found to match and (2b) a spatial separation between the primary line scan sensor and the secondary line scan-sensor.

11. The method of claim 10 further comprising:
the correlation unit correlating according to an individual pixel location matching algorithm at each corresponding pixel location for each of one or more pixel shifts between the one of the current representation of the primary line scan-sensor output and the respective one of the plurality of representations of the past secondary line scan-sensor outputs and the current representation of the secondary line scan-sensor output and the respective one of the plurality of representations of the past primary line scan-sensor outputs.

12. The method of claim 10 further comprising:
the correlation unit correlating according to a full line statistical analysis of each of the one of the current representation of the primary line scan-sensor output and the respective one of the plurality of representations of the past secondary line scan-sensor outputs and the current representation of the secondary line scan-sensor output and the respective one of the plurality of representations of the past primary line scan-sensor outputs, for each respective pixel shift.

13. The method of claim 12 further comprising:
the full line statistical analysis comprising one of normalized cross correlation, mean-squared-error and sum-of-absolute-differences.

14. The method of claim 10 further comprising:
providing, via the correlation unit, an output of a motion indicator comprising a direction of motion of the object being scanned based at least in part on the pixel shift necessary to find the match.

15. The method of claim 12 further comprising:
providing, via the correlation unit, the output of a motion indicator comprising a direction of motion of the object being scanned based at least in part on whether the match is made with the representation of the current primary line scan-sensor output or the representation of the current secondary line scan-sensor output.

16. The method of claim 11 further comprising:
the correlation unit comprising a logic circuit configured to:
receive a selected portion of the current primary line scan-sensor output selected to comprise a representation of the primary line scan-sensor output,
store a plurality of representations of the primary line scan-sensor output,
receive a selected portion of the current secondary line scan-sensor output selected to comprise a representation of the secondary line scan-sensor output,
store a plurality of representations of the primary line scan-sensor output,
compare the representation of the current primary line scan-sensor output with a respective one of the plurality of stored representations of the secondary line scan-sensor output, for each of a selected one or more pixel shifts between the representation of the current primary line scan sensor output and the respective one of the plurality of stored representations of the secondary line scan-sensor output, for a selected number of stored secondary line scan-sensor outputs, to determine if a match can be found,
compare the representation of the current secondary line scan-sensor output with a respective one of the plurality of stored representations of the primary line scan-sensor output, for each of a selected one or more pixel shifts between the representation of the current secondary line scan-sensor output and the respective one of the plurality of stored representations of the primary line scan-sensor output, for a selected number of stored primary line scan-sensor outputs, to determine if a match can be found,
identify the current primary line scan-sensor output and the respective one of the secondary line scan-sensor outputs or the current secondary line scan-sensor output and the respective one of the primary line scan-sensor outputs for which the match exists and the respective pixel shift resulting in the match.

17. The method of 12 further comprising:
the correlation unit comprising a logic circuit configured to:
receive a selected portion of the current primary line scan-sensor output selected to comprise a representation of the primary line scan-sensor output,
store a plurality of representations of the primary line scan-sensor output,
receive a selected portion of the current secondary line scan-sensor output selected to comprise a representation of the secondary line scan-sensor output,
store a plurality of representations of the primary line scan-sensor output, and
align the representation of the current primary line scan-sensor output with a respective one of the plurality of stored representations of the secondary line scan-sensor output, at a pixel shift location for the alignment, for each of a selected one or more pixel shifts between the representation of the current primary line scan-sensor output and the respective one of the plurality of stored representations of the secondary line scan-sensor output, for a selected number of stored representations of the secondary line scan-sensor output, and provide the alignments to a computing device configured to determine if a match can be found utilizing the full line statistical analysis; and align the representation of the current secondary line scan-sensor output with a respective one of the plurality of stored representations of the primary line scan-sensor output, at a pixel shift location for the alignment, for each of a selected one or more pixel shifts between the representation of the current secondary line scan-sensor output and the respective one of the plurality of stored representations of the primary line scan-sensor output, for a selected number of representations of the stored primary line scan-sensor output, and provide the alignments to a computing device configured to determine if a match can be found utilizing the full line statistical analysis.

18. The method of claim 10 further comprising:

the correlating at least one of the representation of the current primary line scan-sensor output and a stored representation of a primary line scan sensor-output or the current secondary line scan-sensor output and a store representation of a secondary line scan-sensor output;

assigning a correlation score to each correlation for the representation of the current primary line scan-sensor output and the respective ones of the representations of the stored secondary line scan-sensor output and saving the highest score as a CorrUP correlation score and assigning a correlation score to each correlation of the representation of current secondary line scan-sensor output and the representations of the stored primary line scan-sensor output and saving the highest score as a CorrDOWN score, and assigning a correlation score to each correlation of either the current representation of the current primary line scan-sensor output and a representation of a stored primary line scan-sensor output of the representations of the current secondary line scan-sensor output and a representation of a stored secondary line scan-sensor output, and to save the highest score as a CorrSIDE; and a computing device configured to determine a direction of motion of the object based on the correlation scores DorrUP, CorrDOWN and CorrSIDE.

19. A non-transitory tangible machine readable medium storing instructions that, when executed by a computing device cause the computing device to perform a method, the method comprising:

receiving from a two line object imaging sensor having a primary line scan-sensor a primary line scan-sensor output, and having a secondary line scan-sensor, a secondary line scan-sensor output, each representing, respectively, the pixels in a current primary scan row of pixels and a current secondary scan row of pixels, the primary line scan-sensor and the secondary line scan-sensor each adapted to scan an object;

storing a selected portion of a current primary line scan-sensor output to maintain a plurality of stored representations of the current primary line scan-sensor output and a plurality of past primary line scan-sensor outputs and a selected portion of a current secondary line scan-sensor output to maintain a plurality of stored representations of the current secondary line scan-sensor output and a plurality of past secondary line scan-sensor outputs;

correlating at least one of the representation of the current primary line scan-sensor output with respective ones of the plurality of representations of the past secondary line scan-sensor outputs and the representation of the current secondary line scan-sensor output with respective ones of the plurality of representations of the past primary line scan-sensor output to find a respective match; and, the correlation unit providing as an output a motion indicator comprising an amplitude of the motion of the object being scanned in a coordinate system coplanar with the primary and secondary line scan-sensors and aligned to the primary line scan-sensor and the secondary line scan-sensor, based at least in part on at least one of (1) a temporal separation of the primary line scan-sensor output and the secondary line scan-sensor output found to match or (2a) a line count between the primary line scan-sensor output and the secondary line scan-sensor output found to match and (2b) a spatial separation between the primary line scan sensor and the secondary line scan-sensor.

20. The non-transitory tangible machine readable medium of claim 19, the method further comprising:

the correlation unit correlating according to a full line statistical analysis of each of the one of the current representation of the primary line scan-sensor output and the respective one of the plurality of representations of the past secondary line scan-sensor outputs and the current representation of the secondary line scan-sensor output and the respective one of the plurality of representations of the past primary line scan-sensor outputs, for each respective pixel shift.

* * * * *